(12) United States Patent
Li et al.

(10) Patent No.: US 10,314,002 B2
(45) Date of Patent: Jun. 4, 2019

(54) METHOD FOR PROVIDING POSITIONING SERVICE, BASE STATION AND TERMINAL

(71) Applicant: CHINA MOBILE COMMUNICATIONS GROUP CO., LTD., Beijing (CN)

(72) Inventors: Nan Li, Beijing (CN); Nan Hu, Beijing (CN); Haiyu Ding, Beijing (CN)

(73) Assignee: CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 15/768,545

(22) PCT Filed: Sep. 2, 2016

(86) PCT No.: PCT/CN2016/097850
§ 371 (c)(1),
(2) Date: Apr. 14, 2018

(87) PCT Pub. No.: WO2017/063463
PCT Pub. Date: Apr. 20, 2017

(65) Prior Publication Data
US 2018/0288729 A1  Oct. 4, 2018

(30) Foreign Application Priority Data

Oct. 15, 2015 (CN) .......................... 2015 1 0666776

(51) Int. Cl.
*H04W 76/14* (2018.01)
*H04W 64/00* (2009.01)
*G01S 19/01* (2010.01)

(52) U.S. Cl.
CPC ............ *H04W 64/003* (2013.01); *G01S 19/01* (2013.01); *H04W 64/00* (2013.01); *H04W 76/14* (2018.02)

(58) Field of Classification Search
CPC ...... H04W 64/003; H04W 76/14; G01S 19/01
See application file for complete search history.

(56) References Cited

U.S. PATENT DOCUMENTS

2008/0186234 A1  8/2008  Alles
2008/0188236 A1  8/2008  Alles
(Continued)

FOREIGN PATENT DOCUMENTS

CN  101232693 A  7/2008
CN  101730222 A  6/2010
(Continued)

OTHER PUBLICATIONS

International Search Report in international application No. PCT/CN2016/097850, dated Nov. 28, 2016.
(Continued)

*Primary Examiner* — Chuong A Ngo
(74) *Attorney, Agent, or Firm* — Syncoda LLC; Feng Ma (57) ABSTRACT

Disclosed are a method for providing a positioning service, a base station, and a terminal. The method for providing a positioning service comprises: sending positioning service provision capability indication information to a terminal; receiving a positioning service request reported by the terminal according to the positioning service provision capability indication information; and providing corresponding positioning service information to the terminal according to the positioning service request. In the content of the present disclosure, a corresponding positioning service is provided by using an existing mobile cellular base station, a great number of positioning base stations do not need to be built, and accordingly construction and maintenance costs can be reduced. In addition, the terminal directly interacts with the base station, and the base station directly provides corresponding positioning service information to the terminal, thereby greatly reducing the transmission delay, and improv- (Continued)

ing the positioning precision of the terminal to a certain extent.

14 Claims, 4 Drawing Sheets

(56) References Cited

U.S. PATENT DOCUMENTS

| | | |
|---|---|---|
| 2008/0188237 A1 | 8/2008 | Alles |
| 2008/0188239 A1 | 8/2008 | Carlson |
| 2008/0188242 A1 | 8/2008 | Carlson |
| 2008/0188244 A1 | 8/2008 | Mazlum |
| 2008/0188245 A1 | 8/2008 | Alles |
| 2008/0189321 A1 | 8/2008 | Alles |
| 2008/0214184 A1 | 9/2008 | Carlson |
| 2008/0214205 A1 | 9/2008 | Alles |
| 2009/0201207 A1 | 8/2009 | Alles |
| 2011/0053613 A1* | 3/2011 | Zhou .................. H04W 64/00 455/456.5 |
| 2012/0302252 A1 | 11/2012 | Alles |
| 2013/0012230 A1 | 1/2013 | Alles |
| 2013/0165145 A1 | 6/2013 | Alles et al. |
| 2015/0038167 A1 | 2/2015 | Alles et al. |

FOREIGN PATENT DOCUMENTS

| | | |
|---|---|---|
| CN | 101990297 A | 3/2011 |
| CN | 102006547 A | 4/2011 |
| CN | 102438311 A | 5/2012 |
| CN | 102946586 A | 2/2013 |
| CN | 103313185 A | 9/2013 |
| CN | 103517312 A | 1/2014 |

OTHER PUBLICATIONS

English Translation of the Written Opinion of the International Search Authority in international application No. PCT/CN2016/097850, dated Nov. 28, 2016.

* cited by examiner

METHOD FOR PROVIDING POSITIONING SERVICE, BASE STATION AND TERMINAL

CROSS-REFERENCE TO RELATED APPLICATION

The present application claims benefit of Chinese Patent Application No. 201510666776.1, filed on Oct. 15, 2015, the contents of which are hereby incorporated by reference in its entirety.

TECHNICAL FIELD

The disclosure relates to the field of wireless communications, and particularly to a method for providing a positioning service, a base station and a terminal.

BACKGROUND

Traditionally, due to a limit of a Selective Availability (SA) policy of the United States, positioning accuracy of a Global Positioning System (GPS) unlicensed by the government of the United States may be reduced. Specifically, a plane position error is smaller than 100 m and an elevation error is smaller than 1.56 m. After the SA policy is abolished, single-point positioning accuracy of the GPS is improved to a certain extent. However, the improved accuracy can reach 20 to 40 m only, and positioning accuracy of a Beidou positioning system is also at a similar order of magnitude. Such accuracy levels are unlikely to meet accuracy requirements of some application fields, for example, aircraft landing, ship entry and Internet of vehicles scheduling.

Recently, the industry proposed use of a GPS/Beidou differential positioning method for improvement of positioning accuracy, and positioning accuracy in part of scenarios may reach a meter level or even a centimeter level. There are usually three differential positioning methods, i.e., wide area differential, single-station differential and areal differential methods.

Specifically, the wide area differential method separates and estimates various errors through a positioning server and performs single-point positioning by virtue of more accurate satellite ephemeris, satellite clock error correction and atmospheric delay model to improve positioning accuracy, and a positioning error is substantially unrelated to a distance between a user and a reference station. However, the wide area differential method is technically complex, need a large construction investment and a long period and involves more industries and departments. In addition, disseminating differential information by virtue of an idle channel of a broadcast signal also requires a terminal to be added with a receiver and a corresponding software parsing function, so that the method is inapplicable to heavily demanded positioning service.

The single-station differential method is simple in structure and algorithm, technically mature and applicable to differential positioning work within a small range. However, during single-station differential, the terminal may receive a correction signal of only one reference station, so that system reliability is poorer. Correspondingly, after the reference station fails, no positioning service may be provided.

The areal differential method involves multiple reference stations and considers influence of a position on differential correction, so that both overall system reliability and the positioning accuracy of the user are greatly improved. However, like the single-station differential method, influence caused by various error sources is combined for consideration in a processing process, and when distances between the reference stations and the terminal are longer, errors are greater and accuracy is lower.

On one hand, the existing differential positioning methods all require additional transmission of "positioning correction information" with a communication link of the terminal, so that cost and complexity of the terminal are increased. On the other hand, a large number of positioning reference stations are required to be constructed, so that construction and maintenance cost is greatly increased.

In the mobile Internet era, both merchants and users require more accurate and timely position information to obtain more business opportunities or more detailed custom service. Along with continuous development of the Internet of vehicles, a requirement on accurate positioning will further be increased in the future, and an assistant high-accuracy positioning service may become an important application with a high frequency of occurrence for users of the whole network in the future.

SUMMARY (I) Technical Problem to be Solved

The disclosure provides a method for providing a positioning service, a base station and a terminal, which solve the problems of complexity and high construction and maintenance cost of the differential positioning method in the prior art.

(II) Technical Solutions

According to an aspect of the disclosure, a method for providing a positioning service is provided, which may be applied to a base station and include that:

positioning service provision capability indication information is sent to a terminal, wherein the positioning service provision capability indication information may include at least one of indication information about whether the base station supports the positioning service, information about one or more positioning service types supported by the base station, information about one or more positioning function types supported by the base station, accuracy information of the positioning service supported by the base station or delay guarantee information.

In a feasible embodiment, the operation that the positioning service provision capability indication information is sent to the terminal may include that:

the positioning service provision capability indication information is sent to the terminal through a broadcast message of the base station; or, the positioning service provision capability indication information is sent to the terminal through a common search area of control signaling of the base station; or, the positioning service provision capability indication information is sent to the terminal through radio resource control information of the base station; or, the positioning service provision capability indication information is sent to the terminal through an application-layer message of the base station.

In a feasible embodiment, the method may further include that:

a positioning service request reported by the terminal according to the positioning service provision capability indication information is received; and corresponding positioning service information is provided for the terminal according to the positioning service request.

In a feasible embodiment, the operation that the corresponding positioning service information is provided for the terminal may include that:

the corresponding positioning service information is provided for the terminal in a broadcast manner; or, the corresponding positioning service information is provided for the terminal in a multicast manner; or, the corresponding positioning service information is provided for the terminal in a unicast manner.

In a feasible embodiment, a manner for bearing the corresponding positioning service information provided for the terminal may be determined according to a number of terminals initiating positioning service requests within a predetermined time or a predetermined service period; or, the manner for bearing the corresponding positioning service information provided for the terminal may be determined according to a number of terminals for which the positioning service is required to be provided within the predetermined time or the predetermined service period; or, the manner for bearing the corresponding positioning service information provided for the terminal may be determined according to an information amount of the positioning service expected to be sent within the predetermined time or the predetermined service period; or, total data amounts corresponding to different sending manners may be determined according to the number of the terminals for which the positioning service is required to be provided and positioning information amount within the predetermined time or the predetermined service period, and a bearing manner with a smallest total data amount may be selected as the manner for bearing the corresponding positioning service information provided for the terminal; or, the manner for bearing the corresponding positioning service information provided for the terminal may be determined according to a delay parameter contained in the positioning service request.

In a feasible embodiment, a sending instant of the positioning service information may be determined by the base station according to the delay parameter contained in the positioning service request; and/or a sending period of the positioning service information may be determined by the base station according to a positioning service information sending period parameter contained in the positioning service request.

In a feasible embodiment, the operation that the corresponding positioning service information is provided for the terminal according to the positioning service request may include that:

positioning service information matched with a positioning accuracy parameter is provided for the terminal according to the positioning accuracy parameter contained in the positioning service request; or, positioning service information matched with a positioning service type and a positioning function type is provided for the terminal according to the positioning service type and positioning function type contained in the positioning service request.

In a feasible embodiment, the method may further include that:

when the base station is unable to meet the positioning service request, the positioning service request is forwarded to an adjacent base station or a positioning server; and when the adjacent base station or the positioning server is able to meet the positioning service request, positioning service information provided by the adjacent base station or the positioning server for the terminal initiating the positioning service request is forwarded to the terminal.

According to another embodiment of the disclosure, a method for providing a positioning service is further provided, which may be applied to a terminal and include that:

positioning service provision capability indication information issued by a base station, of which a serving cell is under coverage, is received, wherein the positioning service provision capability indication information may include at least one of indication information about whether the base station supports the positioning service, information about one or more positioning service types supported by the base station, information about one or more positioning function types supported by the base station, accuracy information of the positioning service supported by the base station or delay guarantee information.

In a feasible embodiment, the method may further include that:

a positioning service request is reported to the base station according to the positioning service provision capability indication information; and corresponding positioning service information provided by the base station according to the positioning service request is received.

In a feasible embodiment, the operation that the positioning service request is reported to the base station may include that:

the positioning service request is reported to the base station, of which the serving cell is under coverage, according to at least one of a positioning service type supported by the terminal, a positioning function type supported by the terminal, or a positioning service requirement of an application program or a service.

According to another embodiment of the disclosure, a base station is further provided, which may include:

a first sending module, configured to send positioning service provision capability indication information to a terminal, wherein the positioning service provision capability indication information may include at least one of indication information about whether the base station supports positioning service, information about one or more positioning service types supported by the base station, information about one or more positioning function types supported by the base station, accuracy information of the positioning service supported by the base station or delay guarantee information.

According to another embodiment of the disclosure, a terminal is further provided, which may include:

a second receiving module, configured to receive positioning service provision capability indication information issued by a base station, of which a serving cell is under coverage, wherein the positioning service provision capability indication information may include at least one of indication information about whether the base station supports positioning service, information about one or more positioning service types supported by the base station, information about one or more positioning function types supported by the base station, accuracy information of the positioning service supported by the base station or delay guarantee information.

(III) Beneficial Effects

According to specific embodiments of the disclosure, at least one of the technical solutions has the following beneficial effects.

The corresponding positioning service is provided by virtue of an existing mobile cellular base station without constructing a large number of positioning reference stations, so that construction and maintenance cost may be reduced. In addition, the terminal directly interacts with the base station, and the base station directly provides the corresponding positioning service information for the terminal, so that a transmission delay is greatly reduced, and positioning accuracy of the terminal is improved to a certain extent.

BRIEF DESCRIPTION OF DRAWINGS

For describing the technical solutions in the embodiments of the disclosure or the conventional art more clearly, the drawings required to be used in descriptions about the embodiments will be simply introduced below. Obviously, the drawings described below are only some embodiments of the disclosure. Those of ordinary skilled in the art may further obtain other drawings according to these drawings without creative work.

DETAILED DESCRIPTION

Specific implementation modes of the disclosure will further be described below in combination with the drawings and embodiments. The following embodiment are only adopted to describe the disclosure but not intended to limit the scope of the disclosure.

For making a purpose, technical solutions and advantages of the embodiments of the disclosure clearer, the technical solutions of the embodiments of the disclosure will be clearly and completely described below in combination with the drawings of the embodiments of the disclosure. Obviously, the described embodiments are not all embodiments but only part of embodiments of the disclosure. All other embodiments obtained by those of ordinary skilled in the art on the basis of the described embodiments of the disclosure shall fall within the scope of protection of the disclosure.

Unless otherwise defined, technical terms or scientific terms used herein shall be ordinary meanings understood by those of ordinary skilled in the art of the disclosure. "First", "second" and similar words used in the patent application specification and claims of the disclosure are adopted not to represent any sequence, number or importance but only to distinguish different parts. Similarly, similar words such as "one" or "a/an" also do not represent a number limit but represent existence of at least one. Similar words such as "connect" or "interconnect" are not limited to physical or mechanical connections but may include electrical connections, either direct or indirect. "Upper", "lower", "left", "right" and the like are only adopted to represent a relative position relationship, and after an absolute position of a described object is changed, the relative position relationship is also correspondingly changed.

Exemplary embodiments of the disclosure will be described below with reference to the drawings in more detail. Although the exemplary embodiments of the disclosure are shown in the drawings, it should be understood that the disclosure may be implemented in various forms and should not be limited by the embodiments elaborated herein. On the contrary, these embodiments are provided to make the disclosure comprehended more thoroughly and deliver the scope of the disclosure to those skilled in the art completely.

First Embodiment

Figure 1:
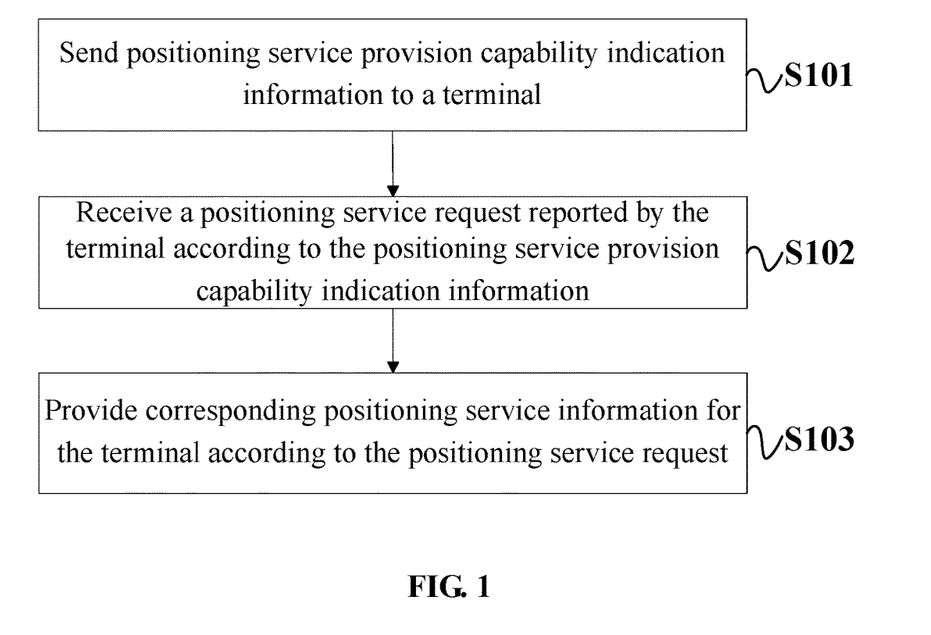
FIG. 1 is a flowchart of a method for providing a positioning service according to a first embodiment of the disclosure.

As shown in FIG. 1, the first embodiment of the disclosure provides a method for providing a positioning service, which is applied to a base station. The base station may be, but not limited to, a Time Division-Synchronization Code Division Multiple Access (TD-SCDMA)/Time Division Long Term Evolution (TD-LTE) network base station. The method specifically includes the following step S101.

In S101, positioning service provision capability indication information is sent to a terminal.

For avoiding the condition that the terminal repeatedly sends a positioning service request to which no response is given, the positioning service provision capability indication information indicating whether to send a positioning service request by the terminal is sent to the terminal, and the positioning service provision capability indication information mentioned here includes, for example, one or more of indication information about whether the base station supports the positioning service, information about one or more positioning service types supported by the base station (the supported positioning service type(s) may include, for example, GPS, Beidou and Glonass), information about one or more positioning function types supported by the base station (for example, providing basic position information of the base station, providing wide area differential correction information and providing single-station or areal differential correction information), accuracy information of the positioning service supported by the base station and/or delay guarantee information (an accuracy level and a delay level).

In a feasible embodiment, the operation that the positioning service provision capability indication information is sent to the terminal includes that:

the positioning service provision capability indication information is sent to the terminal through a broadcast message of the base station; or, the positioning service provision capability indication information is sent to the terminal through a common search area of control signaling of the base station; or, the positioning service provision capability indication information is sent to the terminal through radio resource control information of the base station; or, the positioning service provision capability indication information is sent to the terminal through an application-layer message of the base station.

It is important to point out that the base station may also send the positioning service provision capability indication information to the terminal within coverage of its serving cell in other manners which will not be listed one by one for description herein. The method may further include the following steps S102 and S103.

In S102, a positioning service request reported by the terminal according to the positioning service provision capability indication information is received.

Here, the terminal sends the positioning service request to the base station only when the positioning service provision capability indication information sent to the terminal indicates that the base station supports a positioning service capability, or the terminal sends the positioning service request to the base station only when the positioning service provision capability indication information sent to the terminal indicates that the positioning service type(s) supported by the base station include(s) a positioning service type supported by the terminal, so that unnecessary signaling overhead may be reduced. Herein, the base station receives a positioning service request reported by a terminal within a cell range covered by itself, and the positioning service request may be born by dedicated signaling or application-layer signaling. That is, the base station receives the positioning service request sent by the terminal through an application-layer message.

In S103, corresponding positioning service information is provided for the terminal according to the positioning service request.

When the base station can provide the positioning service and the provided positioning service capability is able to meet the positioning service request of the terminal, or, when an adjacent base station of the base station or a positioning server can provide the positioning service and is able to meet the positioning service request of the terminal, the corresponding positioning service information is provided for the terminal.

When the base station and the adjacent base station or the positioning service cannot provide the positioning service or the provided positioning service capability is unable to meet the positioning service request of the terminal, the corresponding positioning service information is denied to be provided for the terminal, and a positioning service denial response is sent to the terminal.

In a feasible embodiment, the manners for bearing the positioning service information include: the base station provides the corresponding positioning service information for the terminal in a broadcast manner, or, provides the corresponding positioning service information for the terminal in a multicast manner, or, provides the corresponding positioning service information for the terminal in a unicast manner.

Specifically, determination of the manner for bearing the positioning service information may be implemented in one of the following manners.

A first manner: the base station determines the manner for bearing the positioning service information according to the number of terminals initiating positioning service requests within a predetermined time or a predetermined service period, so as to minimize a related signaling overhead required by system positioning service. Specifically, different bearing manners may be determined for positioning services of different positioning service types. That is, the base station determines a manner for bearing positioning service information according to the number of terminals initiating positioning service requests for the same positioning service type within a certain time or period. For example, when the number of terminals initiating positioning service requests for a certain positioning service type within a certain time or period exceeds a first threshold value, the base station bears positioning service information in the broadcast manner; when the number of the terminals initiating the positioning service requests for the certain positioning service type exceeds a second threshold value lower than the first threshold value, the base station bears the positioning service information in the multicast manner; and when the number of the terminals initiating the positioning service requests for the certain positioning service type is lower than the second threshold value, the base station bears the positioning service information in the unicast manner. Here, those skilled in the art may set the first threshold value and the second threshold value as desired, as long as basic requirements of different sending manners such as the broadcast manner, the multicast manner and the unicast manner are met.

A second manner: the base station determines the manner for bearing the positioning service information according to the number of terminals for which the positioning service is required to be provided within the predetermined time or the predetermined service period, so as to minimize the related signaling overhead required by the system positioning service. Specifically, the base station determines a manner for bearing positioning service information according to the number of terminals with a requirement on the same positioning service type within a certain time or period. The specific determination method may refer to the first manner and thus will not be elaborated herein.

A third manner: the bearing manner is determined according to an information amount of the positioning service expected to be sent within the predetermined time or the predetermined service period. For example, when an information amount of positioning service information required to be sent for a certain positioning service type within a certain time or period exceeds a first threshold value, the base station bears the positioning service information in the broadcast manner; when the information amount of the positioning service information required to be sent for the certain positioning service type within the certain time or period exceeds a second threshold value lower than the first threshold value, the base station bears the positioning service information in the multicast manner; and when the information amount of the positioning service information required to be sent for the certain positioning service type within the certain time or period is lower than the second threshold value, the base station bears the positioning service information in the unicast manner. Here, those skilled in the art may set the first threshold value and the second threshold value as desired, as long as the basic requirements of different sending manners such as the broadcast manner, the multicast manner and the unicast manner are met.

A fourth manner: the base station may further determine total data amounts corresponding to different sending manners according to the number of the terminals for which the positioning service is required to be provided and positioning information amount within the predetermined time or the predetermined service period, and select the bearing manner with the smallest total data amount as the manner for bearing the corresponding positioning service information provided for the terminal. That is, the base station may determine total data amounts corresponding to positioning service information required to be issued in different bearing manners within a certain time or period according to the number of terminals initiating positioning service requests for a certain positioning service type and a corresponding positioning service information sending period, and select the bearing manner with the smallest total data amount to bear the positioning service information.

A fifth manner: the manner for bearing the corresponding positioning service information provided for the terminal is determined according to a delay parameter contained in the positioning service request. Specifically, when the terminal has a lower positioning service establishment delay requirement (level s) and there are more terminals requiring the positioning service, the base station adopts the broadcast or multicast manner for sending. For example, broadcast information SIB_X is newly defined, and its sending period is at the level s; or some of subframes are configured to be Multimedia Broadcast Multicast Service (MBMS) over Single Frequency Network (MBSFN) subframes for multicast. When the terminal has a higher positioning service establishment delay requirement (level ms), the base station may adopt the unicast manner for sending. When the terminal has a lower positioning service establishment delay requirement (level s) and there are fewer terminals requiring the positioning service, the base station adopts the unicast manner for sending.

From the above, the corresponding positioning service is provided by virtue of an existing mobile cellular base station without constructing a large number of positioning reference stations, so that construction and maintenance cost may be reduced. In addition, the terminal directly interacts with the base station, and the base station directly provides the corresponding positioning service information for the terminal, so that a transmission delay is greatly reduced, and positioning accuracy of the terminal is improved to a certain extent.

Second Embodiment

In the first embodiment, the method for providing the positioning service is simply introduced. The method will further be introduced below in combination with FIG. 2, and specifically includes S201 and S202.

Figure 2:
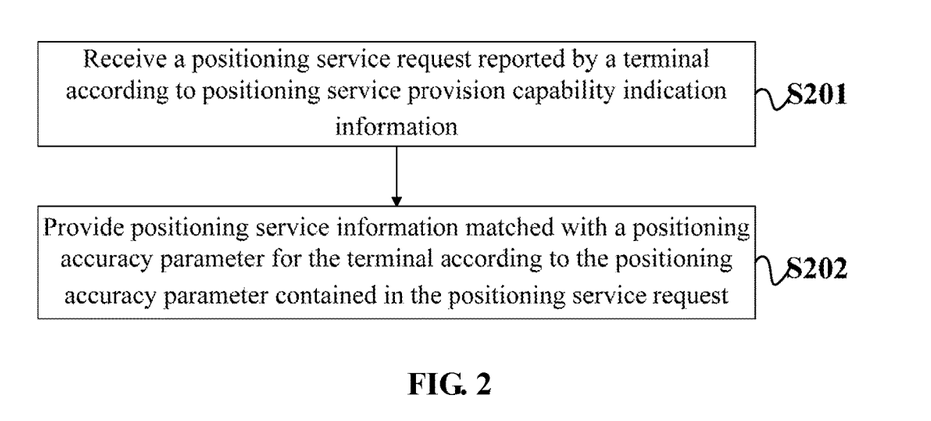
FIG. 2 is a flowchart of a method for providing a positioning service according to a second embodiment of the disclosure.

In S201, a positioning service request reported by a terminal according to positioning service provision capability indication information is received.

The positioning service request contains positioning accuracy required by the terminal, a delay parameter and a positioning service information sending period parameter. Specifically, a sending instant of the positioning service information is determined by a base station according to the delay parameter contained in the positioning service request, and a sending period of the positioning service information is determined by the base station according to the positioning service information sending period parameter contained in the positioning service request.

In S202, positioning service information matched with a positioning accuracy parameter is provided for the terminal according to the positioning accuracy parameter contained in the positioning service request.

The positioning accuracy parameter sent by the terminal includes one or more information bits representing an accuracy requirement or accuracy level required by the terminal. For example, the accuracy level is divided into levels 1-9 from high to low, and is represented with 3 bit information. When the base station may provide the accuracy level 2, the accuracy level represented by the 3 bit information in the positioning accuracy parameter is 3, and it indicates that the base station is able to meet the accuracy requirement of the terminal and can provide the corresponding positioning service information for it. In addition, a delay level may also be divided into levels 1-9 from high to low, and is also represented with 3 bit information, and the delay parameter sent by the terminal includes one or more information bits representing a delay requirement or a delay level required by the terminal.

Third Embodiment

Figure 3:
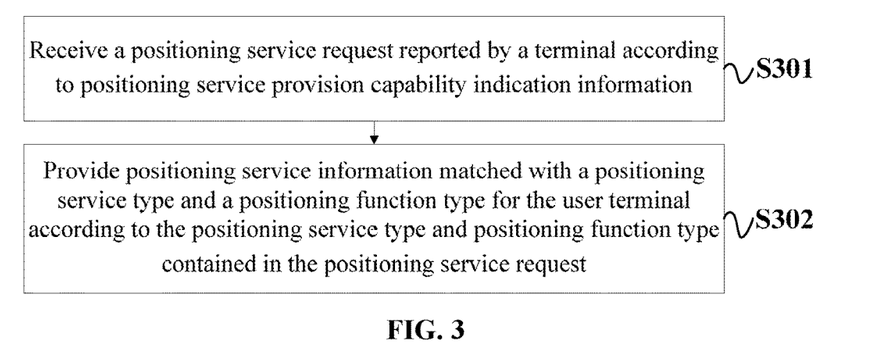
FIG. 3 is a flowchart of a method for providing a positioning service according to a third embodiment of the disclosure.

Different from the second embodiment, the method in the third embodiment specifically includes S301 to S302, as shown in FIG. 3.

In S301, a positioning service request reported by a terminal according to positioning service provision capability indication information is received.

In a feasible embodiment, the positioning service request includes a positioning service type and positioning function type required by the terminal. Specifically, the positioning service type includes the GPS satellite positioning service, the Beidou satellite positioning service, the GLONASS satellite positioning service, the base station aided positioning service, enhanced cell identification positioning, a time difference of arrival positioning method, base station position information and the like. The positioning function type includes: a wide area differential positioning function, a single-station differential positioning function, a base station basic position information function, a base station aided satellite positioning function and the like.

In S302, positioning service information matched with the positioning service type and the positioning function type is provided for the terminal according to the positioning service type and positioning function type contained in the positioning service request.

It is mentioned here that the base station selects the matched positioning service information according to the positioning service type and positioning function type required by the terminal. For example, when the positioning service type required by the terminal is GPS satellite positioning and the positioning function type is assistant satellite searching service, the base station or a positioning server may provide positioning information of a GPS satellite which may be found at a position of the terminal, for example, one or more of information of a satellite number, a satellite elevation, a satellite azimuth, a satellite clock error parameter and an ephemeris parameter. When the positioning service type required by the terminal is Beidou satellite positioning and the positioning function type is wide area differential positioning service, the base station or the positioning server may provide positioning information of a Beidou satellite which may be found at the position of the terminal, for example, a satellite number, a satellite elevation, a satellite azimuth, a satellite clock error parameter and an ephemeris parameter, and one or more of a differential information satellite identifier, differential range error index, areal user range error index and equivalent clock error correction required by wide area differential. When the positioning service type required by the terminal is Beidou satellite positioning and the positioning function type is single-station differential positioning, the base station or the positioning server sends a locally corrected position error or range error parameter to the terminal for differential positioning enhancement.

It is important to point out that two implementation modes for providing the positioning service information for the terminal are introduced in the second embodiment and the third embodiment respectively, the two modes may be combined in implementation. For example, the base station selects the corresponding positioning service information for the terminal by taking into account the positioning service type, positioning function type and positioning accuracy required by the terminal, the delay parameter, and the positioning service information sending period parameter.

For example, information in the positioning service request sent by the terminal is as follows: the "positioning service type" is "Beidou differential positioning", an "accuracy level" is "1" and a "delay level" is "2"; and a positioning service capability which can be provided by the base station is as follows: supported "positioning service types" include "Beidou differential positioning" and "GPS differential positioning", service at the accuracy level of 1 may be provided when the "accuracy level" is supporting Beidou differential positioning, and service at the delay level of 1 may be provided when the "delay level" is supporting Beidou differential positioning. From the above, it can be seen that the base station is able to meet the positioning service requirement of the terminal and can provide the corresponding positioning service information for the terminal.

Fourth Embodiment

In addition, the method for providing the positioning service can also be applied to the following scenario.

When the base station is unable to meet the positioning service request, the positioning service request is forwarded to an adjacent base station or a positioning server.

When the adjacent base station or the positioning server is able to meet the positioning service request, positioning service information provided by the adjacent base station or the positioning server for the terminal initiating the positioning service request is forwarded to the terminal. For example, the information in the positioning service request sent by the terminal is as follows: the "positioning service type" is "Beidou differential positioning", the "accuracy level" is "1" and the "delay level" is "2"; and the positioning service capability which can be provided by the base station is as follows: the supported "positioning service types" include "Beidou differential positioning" and "GPS differential positioning", a service at the accuracy level of 2 can be provided when the "accuracy level" is supporting Beidou differential positioning, and a service at the delay level of 2 can be provided when the "delay level" is supporting Beidou differential positioning. From the above, it can be seen that the base station is unable to meet the positioning service requirement of the terminal. Under such a condition, the base station may acquire a positioning service type provided by an adjacent base station or a positioning server and a corresponding capability through an X2 interface, a dedicated data line or the like and construct a virtual bearer for the terminal, and becomes a relay node for the positioning service for the terminal. For example, the base station learns about that a positioning service capability which can be provided by a certain adjacent base station is as follows: supported "positioning service types" include "Beidou differential positioning" and "GPS differential positioning", a service at the accuracy level of 1 can be provided when the "accuracy level" is supporting Beidou differential positioning, and a service at the delay level of 1 can be provided when the "delay level" is supporting Beidou differential positioning. From the above, it can be seen that the adjacent base station is able to meet the positioning service requirement of the terminal. At this instant, the base station judges whether the adjacent base station is able to meet the requirement of the terminal on the "delay level" of the positioning service based on the "delay level" of the positioning service of the adjacent base station and a round-trip delay of signaling interaction with the adjacent base station. For example, if it is judged that the service requirement can be met, a positioning service bearer is established with the adjacent base station, and a positioning service message is actually provided by the adjacent base station, issued to the base station through an interface between the base station and the adjacent base station, and then issued to the terminal by the base station.

Fifth Embodiment

The method of the disclosure for providing the positioning service is described above from a base station side in the first embodiment to the fourth embodiment respectively. The method of the disclosure for providing the positioning service will further be described below from a terminal side in combination with the drawing.

Figure 4:
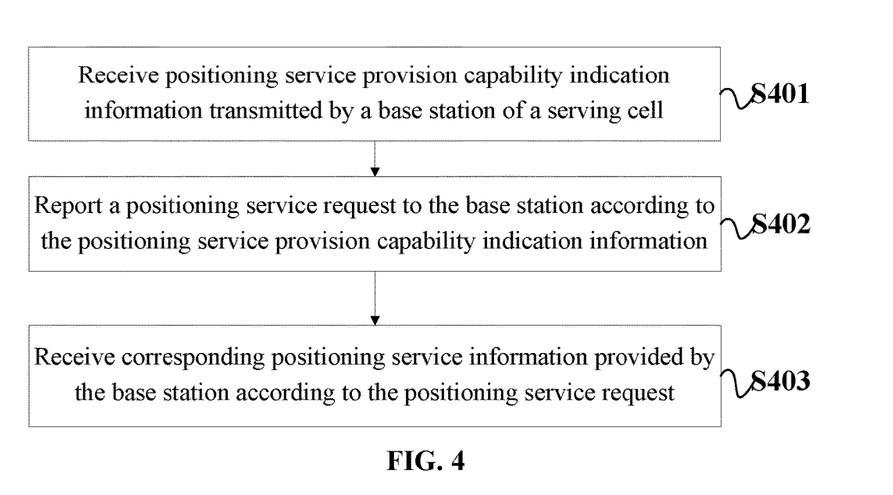
FIG. 4 is a flowchart of a method for providing a positioning service according to a fifth embodiment of the disclosure.

In FIG. 4, the method for providing the positioning service specifically includes S401.

In S401, positioning service provision capability indication information issued by a base station, of which a serving cell is under coverage, is received.

In a feasible embodiment, the positioning service provision capability indication information includes one or more of indication information about whether the base station supports the positioning service (information about whether a positioning service capability is supported or not), information about one or more positioning service types supported by the base station (the supported positioning service type is, for example, GPS, Beidou and Glonass), information about one or more positioning function types supported by the base station (for example, providing basic position information of the base station, providing wide area differential correction information and providing single-station or areal differential correction information), accuracy information of the positioning service supported by the base station and/or delay guarantee information (an accuracy level and a delay level).

For example, the method may further include S402 and S403.

In S402, a positioning service request is reported to the base station according to the positioning service provision capability indication information.

Here, the terminal sends the positioning service request to the base station only when the positioning service provision capability indication information sent to the terminal indicates that the base station supports the positioning service capability, or the terminal sends the positioning service request to the base station only when the positioning service provision capability indication information sent to the terminal indicates that the positioning service type supported by the base station includes a positioning service type supported by the terminal, so that unnecessary signaling overhead may be reduced. Herein, the terminal reports a positioning service request to a base station, of which a present serving cell is under coverage, where the positioning service request may be born by dedicated signaling or application-layer signaling. That is, the terminal may send the positioning service request to the base station through an application-layer message.

In S403, corresponding positioning service information provided by the base station according to the positioning service request is received.

When the base station may provide the positioning service and the provided positioning service capability is able to meet the positioning service request of the terminal, or, when an adjacent base station of the base station or a positioning server may provide the positioning service and is able to meet the positioning service request of the terminal, the terminal receives the corresponding positioning service information provided by the base station.

When none of the base station, the adjacent base station, and the positioning server can provide the positioning service or the provided positioning service capability is unable to meet the positioning service request of the terminal, the terminal receives a positioning service denial response sent when the base station denies the positioning service request.

In a feasible embodiment, a manner for bearing the positioning service information is determined by the base station according to the number of terminals initiating positioning service requests within a predetermined time or a predetermined service period, so as to minimize a related signaling overhead required by the system positioning service. Specifically, different bearing manners may be determined for positioning services of different positioning service types. That is, the base station determines a manner for bearing positioning service information according to the number of terminals initiating positioning service requests for the same positioning service type within a certain time or period. For example, when the number of terminals initiating positioning service requests for a certain positioning service type within a certain time or period exceeds a first threshold value, the base station bears positioning service information in a broadcast manner; when the number of the terminals initiating the positioning service requests for the certain positioning service type exceeds a second threshold value lower than the first threshold value, the base station bears the positioning service information in a multicast manner; and when the number of the terminals initiating the positioning service requests for the certain positioning service type is lower than the second threshold value, the base station bears the positioning service information in a unicast manner. Here, those skilled in the art may set the first threshold value and the second threshold value as desired, as long as basic requirements of different sending manners such as the broadcast manner, the multicast manner and the unicast manner are met.

In a feasible embodiment, the operation that the positioning service request is reported to the base station includes that:

the positioning service request is reported to the base station, of which the serving cell is under coverage, according to at least one of a positioning service type supported by the terminal, a positioning function type supported by the terminal, or a positioning service requirement of an application program or a service. When the positioning service provision capability indication information sent by the base station indicates that the base station is able to meet the positioning service requirement of the terminal, the terminal sends the positioning service request to the base station according to the acquired positioning service provision capability indication information in combination with one or more of the positioning service type supported by the terminal, the positioning function type supported by the terminal, and the positioning service requirement of the application program or the service of the terminal.

From the above, according to the embodiment of the disclosure, the corresponding positioning service is provided by virtue of an existing mobile cellular base station without constructing a large number of positioning reference stations, so that construction and maintenance cost may be reduced. In addition, the terminal directly interacts with the base station, and the base station directly provides the corresponding positioning service information for the terminal, so that a transmission delay is greatly reduced, and positioning accuracy of the terminal is improved to a certain extent.

Sixth Embodiment

Figure 5:
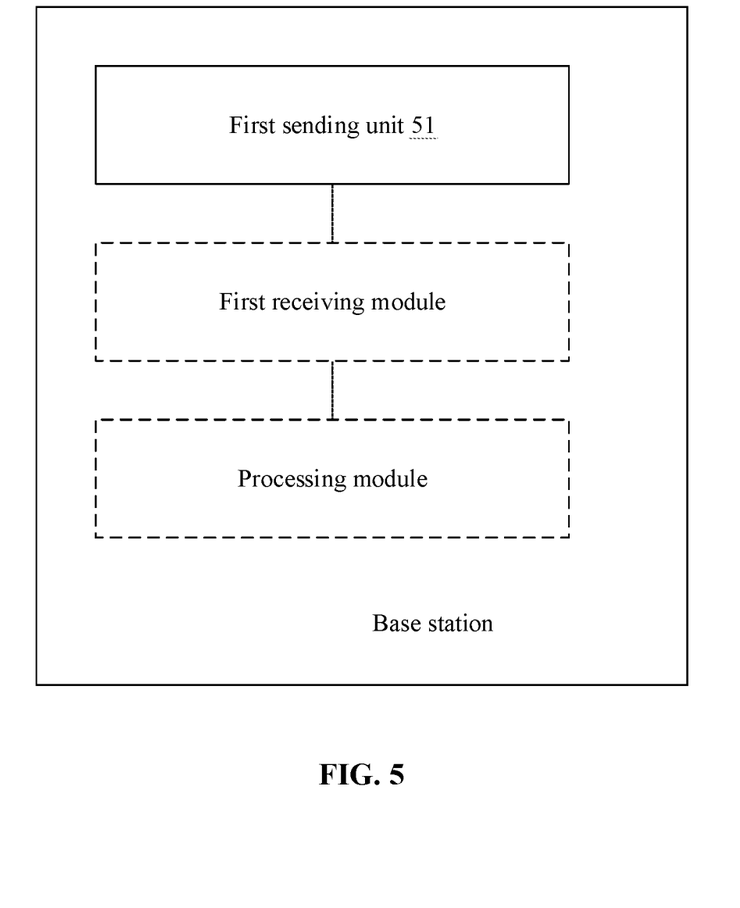
FIG. 5 is a module diagram of a base station according to a sixth embodiment of the disclosure.

According to another aspect of the disclosure, a base station is further provided. As shown in FIG. 5, the base station includes a first sending module 51.

The first sending module 51 is configured to send positioning service provision capability indication information to a terminal, wherein the positioning service provision capability indication information includes one or more of indication information about whether the base station supports positioning service, information about one or more positioning service types supported by the base station, information about one or more positioning function types supported by the base station, accuracy information of the positioning service supported by the base station and/or delay guarantee information.

In a feasible embodiment, the first sending module 51 may further include:

a first sending unit, configured to send the positioning service provision capability indication information to the terminal through a broadcast message of the base station; or, a second sending unit, configured to send the positioning service provision capability indication information to the terminal through a common search area of control signaling of the base station; or, a third sending unit, configured to send the positioning service provision capability indication information to the terminal through radio resource control information of the base station; or, a fourth sending unit, configured to send the positioning service provision capability indication information to the terminal through an application-layer message of the base station.

In a feasible embodiment, the base station further includes:

a first receiving module, configured to receive a positioning service request reported by the terminal according to the positioning service provision capability indication information; and a processing module, configured to provide corresponding positioning service information for the terminal according to the positioning service request.

In a feasible embodiment, the processing module includes:

a first processing unit, configured to provide the corresponding positioning service information for the terminal in a broadcast manner; or, a second processing unit, configured to provide the corresponding positioning service information for the terminal in a multicast manner; or, a third processing unit, configured to provide the corresponding positioning service information for the terminal in a unicast manner.

In a feasible embodiment, the base station further includes:

a first bearing module, configured to determine a manner for bearing the corresponding positioning service information provided for the terminal according to a number of terminals initiating positioning service requests within a predetermined time or a predetermined service period; or, a second bearing module, configured to determine the manner for bearing the corresponding positioning service information provided for the terminal according to a number of terminals for which the positioning service is required to be provided within the predetermined time or the predetermined service period; or, a third bearing module, configured to determine the manner for bearing the corresponding positioning service information provided for the terminal according to an information amount of the positioning service expected to be sent within the predetermined time or the predetermined service period; or, a fourth bearing module, configured to determine total data amounts corresponding to different sending manners according to the number of the terminals for which the positioning service is required to be provided and positioning information amount within the predetermined time or the predetermined service period and select the bearing manner with the smallest total data amount as the manner for bearing the corresponding positioning service information provided for the terminal; or, a fifth bearing module, configured to determine the manner for bearing the corresponding positioning service information provided for the terminal according to a delay parameter contained in the positioning service request.

In a feasible embodiment, the base station further includes:

a first determination module, configured to determine a sending instant of the positioning service information according to the delay parameter contained in the positioning service request; and/or a second determination module, configured to determine a sending period of the positioning service information according to a positioning service information sending period parameter contained in the positioning service request.

In a feasible embodiment, the processing module further includes:

a fourth processing unit, configured to provide positioning service information matched with a positioning accuracy parameter for the terminal according to the positioning accuracy parameter contained in the positioning service request; or, a fifth processing unit, configured to provide positioning service information matched with a positioning service type and a positioning function type for the terminal according to the positioning service type and positioning function type contained in the positioning service request.

In a feasible embodiment, the base station further includes:

a first forwarding module, configured to, when the base station is unable to meet the positioning service request, forward the positioning service request to an adjacent base station or a positioning server; and a second forwarding module, configured to, when the adjacent base station or the positioning server is able to meet the positioning service request, forward positioning service information provided by the adjacent base station or the positioning server for the terminal initiating the positioning service request to the terminal.

It is to be noted that the base station corresponds to the method for providing the positioning service introduced in the first embodiment to the fourth embodiment, all of the implementation modes in the method embodiments are applied to the embodiment of the base station, and the same technical effects may also be achieved.

Seventh Embodiment

Figure 6:
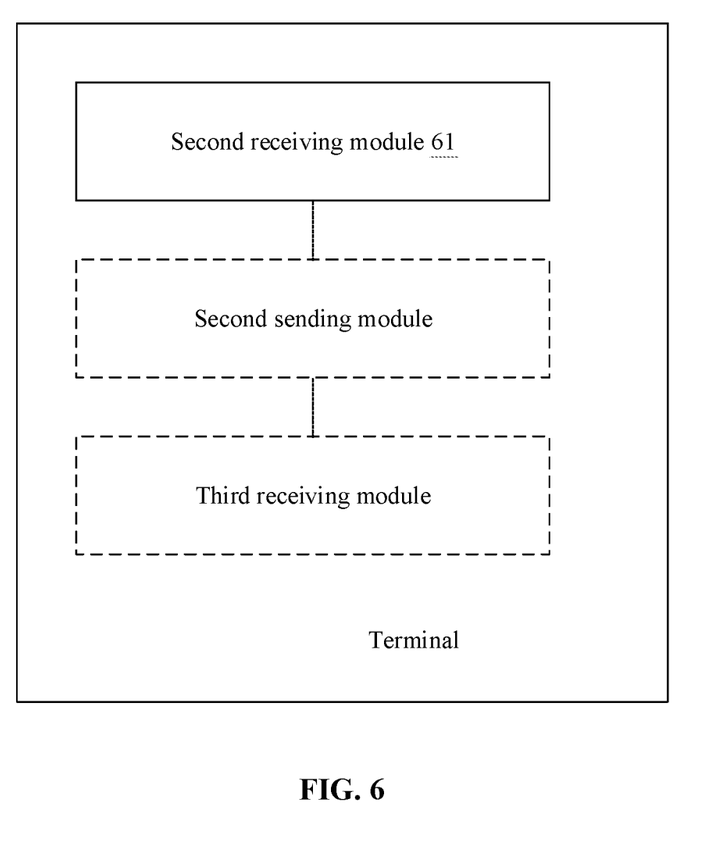
FIG. 6 is a module diagram of a terminal according to a seventh embodiment of the disclosure.

According to another embodiment of the disclosure, a terminal is further provided. As shown in FIG. 6, the terminal includes a second receiving module 61.

The second receiving module 61 is configured to receive positioning service provision capability indication information issued by a base station, of which a serving cell is under coverage, wherein the positioning service provision capability indication information includes one or more of indication information about whether the base station supports the positioning service, information about one or more positioning service types supported by the base station, information about one or more positioning function types supported by the base station, accuracy information of the positioning service supported by the base station and/or delay guarantee information.

In a feasible embodiment, the terminal further includes:

a second sending module, configured to report a positioning service request to the base station according to the positioning service provision capability indication information; and a third receiving module, configured to receive corresponding positioning service information provided by the base station according to the positioning service request.

In a feasible embodiment, the second sending module includes:

a fifth sending unit, configured to report the positioning service request to the base station, of which the serving cell is under coverage, according to at least one of a positioning service type supported by the terminal, a positioning function type supported by the terminal, or a positioning service requirement of an application program or a service.

It is to be noted that the terminal corresponds to the method for providing the positioning service introduced in the fifth embodiment, all of the implementation modes in the method embodiment are applied to the embodiment of the terminal, and the same technical effects may also be achieved.

The above is the preferred implementation mode of the disclosure. It should be pointed out that those of ordinary skilled in the art may further make a plurality of improvements and embellishments without departing from the principle of the disclosure and these improvements and embellishments shall fall within the scope of protection of the disclosure.

The invention claimed is:

1. A method for providing a positioning service, applied to a base station, the method comprising:

sending positioning service provision capability indication information to a terminal, wherein the positioning service provision capability indication information comprises at least one of indication information about whether the base station supports the positioning service, information about one or more positioning service types supported by the base station, information about one or more positioning function types supported by the base station, accuracy information of the positioning service supported by the base station, or delay guarantee information;

receiving a positioning service request reported by the terminal according to the positioning service provision capability indication information; and providing, according to the positioning service request, corresponding positioning service information for the terminal, wherein a manner for bearing the corresponding positioning service information provided for the terminal is determined according to a number of terminals initiating positioning service requests within a predetermined time or a predetermined service period; or, a manner for bearing the corresponding positioning service information provided for the terminal is determined according to a number of terminals for which the positioning service is required to be provided within a predetermined time or a predetermined service period; or, a manner for bearing the corresponding positioning service information provided for the terminal is determined according to an information amount of the positioning service expected to be sent within a predetermined time or a predetermined service period; or, total data amounts corresponding to different sending manners are determined according to a number of the terminals for which the positioning service is required to be provided and a positioning information amount within a predetermined time or a predetermined service period, and a bearing manner with a smallest total data amount is selected as a manner for bearing the corresponding positioning service information provided for the terminal; or, a manner for bearing the corresponding positioning service information provided for the terminal is determined according to a delay parameter contained in the positioning service request.

2. The method for providing the positioning service according to claim 1, wherein sending the positioning service provision capability indication information to the terminal comprises:

sending the positioning service provision capability indication information to the terminal through a broadcast message of the base station; or, sending the positioning service provision capability indication information to the terminal through a common search area of control signaling of the base station; or, sending the positioning service provision capability indication information to the terminal through radio resource control information of the base station; or, sending the positioning service provision capability indication information to the terminal through an application-layer message of the base station.

3. The method for providing the positioning service according to claim 1, wherein the manner for bearing the corresponding positioning service information provided for the terminal comprises:

providing the corresponding positioning service information for the terminal in a broadcast manner; or, providing the corresponding positioning service information for the terminal in a multicast manner; or, providing the corresponding positioning service information for the terminal in a unicast manner.

4. The method for providing the positioning service according to claim 1, wherein providing, according to the positioning service request, corresponding positioning service information for the terminal comprises at least one of the following:

determining a sending instant of the positioning service information by the base station according to the delay parameter contained in the positioning service request; or determining a sending period of the positioning service information by the base station according to a positioning service information sending period parameter contained in the positioning service request.

5. The method for providing the positioning service according to claim 1, wherein providing the corresponding positioning service information for the terminal according to the positioning service request comprises:

providing positioning service information matched with a positioning accuracy parameter for the terminal according to the positioning accuracy parameter contained in the positioning service request; or, providing positioning service information matched with a positioning service type and a positioning function type for the terminal according to the positioning service type and the positioning function type contained in the positioning service request.

6. The method for providing the positioning service according to claim 1, further comprising:

when the base station is unable to meet the positioning service request, forwarding the positioning service request to an adjacent base station or a positioning server; and when the adjacent base station or the positioning server is able to meet the positioning service request, forwarding positioning service information provided by the adjacent base station or the positioning server for the terminal initiating the positioning service request to the terminal.

7. A method for providing a positioning service, applied to a terminal, the method comprising:

receiving positioning service provision capability indication information issued by a base station, of which a serving cell is under coverage, wherein the positioning service provision capability indication information comprises at least one of indication information about whether the base station supports the positioning service, information about one or more positioning service types supported by the base station, information about one or more positioning function types supported by the base station, accuracy information of the positioning service supported by the base station, or delay guarantee information;

reporting a positioning service request to the base station according to the positioning service provision capability indication information; and receiving corresponding positioning service information provided by the base station according to the positioning service request, wherein a manner for bearing the corresponding positioning service information is determined by the base station according to a number of terminals initiating positioning service requests within a predetermined time or a predetermined service period; or, a manner for bearing the corresponding positioning service information is determined by the base station according to a number of terminals for which the positioning service is required to be provided within a predetermined time or a predetermined service period; or, a manner for bearing the corresponding positioning service information is determined by the base station according to an information amount of the positioning service expected to be sent within a predetermined time or a predetermined service period; or, total data amounts corresponding to different sending manners are determined by the base station according to a number of the terminals for which the positioning service is required to be provided and a positioning information amount within a predetermined time or a predetermined service period, and a bearing manner with a smallest total data amount is selected as a manner for bearing the corresponding positioning service information provided for the terminal; or, a manner for bearing the corresponding positioning service information is determined by the base station according to a delay parameter contained in the positioning service request.

8. The method for providing the positioning service according to claim 7, wherein reporting the positioning service request to the base station comprises:

reporting the positioning service request to the base station, of which the serving cell is under coverage, according to at least one of a positioning service type supported by the terminal, a positioning function type supported by the terminal, or a positioning service requirement of an application program or a service.

9. A base station, comprising a processor and a memory storing computer-readable operation instructions, wherein when the computer-readable operation instructions in the memory are run, the processor is configured to:
send positioning service provision capability indication information to a terminal, wherein the positioning service provision capability indication information comprises at least one of indication information about whether the base station supports positioning service, information about one or more positioning service types supported by the base station, information about one or more positioning function types supported by the base station, accuracy information of the positioning service supported by the base station, or delay guarantee information;
receive a positioning service request reported by the terminal according to the positioning service provision capability indication information; and
provide, according to the positioning service request, corresponding positioning service information for the terminal,
wherein the processor is specifically configured to:
determine a manner for bearing the corresponding positioning service information provided for the terminal according to a number of terminals initiating positioning service requests within a predetermined time or a predetermined service period; or,
determine a manner for bearing the corresponding positioning service information provided for the terminal according to a number of terminals for which the positioning service is required to be provided within a predetermined time or a predetermined service period; or,
determine a manner for bearing the corresponding positioning service information provided for the terminal according to an information amount of the positioning service expected to be sent within a predetermined time or a predetermined service period; or,
determine total data amounts corresponding to different sending manners according to a number of the terminals for which the positioning service is required to be provided and a positioning information amount within a predetermined time or a predetermined service period and select a bearing manner with a smallest total data amount as a manner for bearing the corresponding positioning service information provided for the terminal; or,
determine a manner for bearing the corresponding positioning service information provided for the terminal according to a delay parameter contained in the positioning service request.

10. The base station according to claim 9, wherein the processor is configured to:
send the positioning service provision capability indication information to the terminal through a broadcast message of the base station; or,
send the positioning service provision capability indication information to the terminal through a common search area of control signaling of the base station; or,
send the positioning service provision capability indication information to the terminal through radio resource control information of the base station; or,
send the positioning service provision capability indication information to the terminal through an application-layer message of the base station.

11. The base station according to claim 9, wherein the manner for bearing the corresponding positioning service information provided for the terminal comprises:
providing the corresponding positioning service information for the terminal in a broadcast manner; or,
providing the corresponding positioning service information for the terminal in a multicast manner; or,
providing the corresponding positioning service information for the terminal in a unicast manner.

12. The base station according to claim 9, wherein the processor is further configured to:
determine a sending instant of the positioning service information according to the delay parameter contained in the positioning service request; or
determine a sending period of the positioning service information according to a positioning service information sending period parameter contained in the positioning service request.

13. The base station according to claim 9, wherein the processor is further configured to:
provide positioning service information matched with a positioning accuracy parameter for the terminal according to the positioning accuracy parameter contained in the positioning service request; or,
provide positioning service information matched with a positioning service type and a positioning function type for the terminal according to the positioning service type and the positioning function type contained in the positioning service request.

14. The base station according to claim 9, wherein the processor is further configured to:
when the base station is unable to meet the positioning service request, forward the positioning service request to an adjacent base station or a positioning server; and
when the adjacent base station or the positioning server is able to meet the positioning service request, forward positioning service information provided by the adjacent base station or the positioning server for the terminal initiating the positioning service request to the terminal.

* * * * *